Patented Nov. 6, 1928.

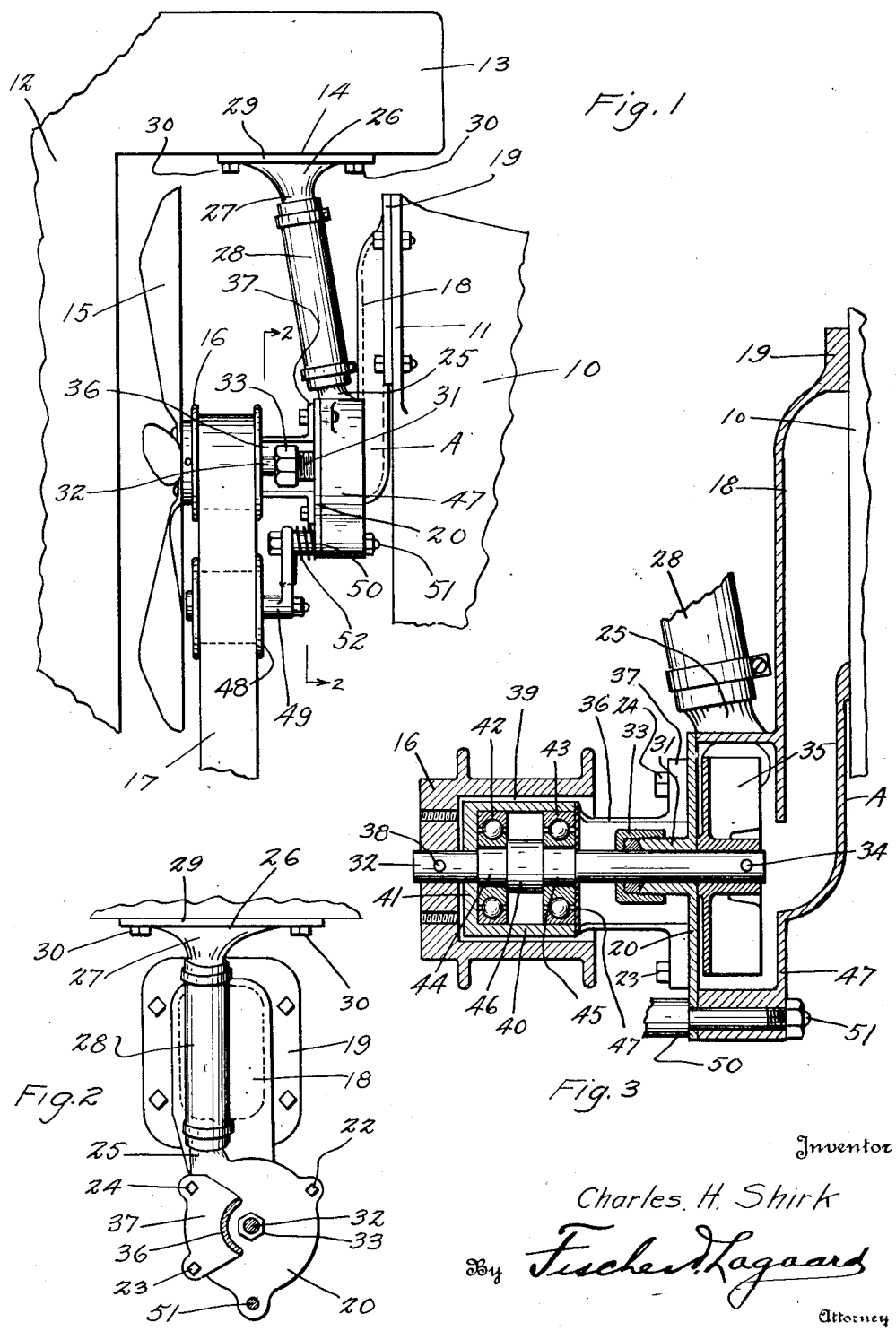

1,690,911

UNITED STATES PATENT OFFICE.

CHARLES H. SHIRK, OF ST. PAUL, MINNESOTA.

WATER-CIRCULATING PUMP FOR MOTORS.

Application filed May 18, 1923. Serial No. 639,879.

My invention relates to water circulating pumps for motors and has for its object to provide a pump which may be substituted in place of the fan pulley and support therefor and operated by the fan belt to circulate water through the cooling system of a motor.

Another object of the invention resides in providing bearings within the fan pulley proper by means of which the amount of wear on the bearings for supporting the pump is greatly reduced.

A still further object is to provide a centrifugal pump having a stuffing box through which the driving shaft extends, which pump has attached to it a support extending into the fan pulley of the device, said support and shaft being provided with ball bearings within the interior of the said pulley by means of which the pulley and rotatable member of the water circulating pump is journaled without causing the strain imparted to the said pulley by the fan belt to be transmitted to the stuffing box thereby increasing the life of the circulating pump.

A still further object is to form the pump casing with a cover plate having attached to it a stuffing box through which the shaft operating the rotatable member of the pump extends and to further provide a tubular bracket which is secured to said cover plate and extends inwardly within the interior of the fan pulley which is attached to the extreme end of said shaft, which support has positioned within it ball bearings mounted upon said shaft whereby the said shaft, pulley and pump member are rotatably supported independent of the stuffing box of the said pump.

Other objects of the invention reside in the detailed construction of the same, as clearly brought out in the specification and disclosed in the drawings relating to my invention.

In the drawings illustrating my invention in one form;

Figure 1 is a side elevational view of a portion of a motor, and the cooling system therefor showing my invention applied thereto.

Figure 2 is a sectional view taken on line 2—2 of Figure 1.

Figure 3 is an enlarged sectional view taken through the pump and driving pulley therefor.

My invention is particularly adapted to be used in conjunction with the water circulating systems of motors, such as are now employed with tractors and is particularly adapted to be installed and to be operated by the fan belt of the motor. In devices of a similar nature where the shaft is journalled in bearings directly attached to the pump casing, the said bearings have worn out very quickly due to the strain applied to the fan pulley when the said belt has been unnecessarily tightened thereby causing the said pumps to wear out and leak in a very short time. My invention overcomes these difficulties by arranging the bearings within a detachable support secured to the pump casing, which support extends within the interior of the fan pulley.

In Figure 1, I have shown a portion of a motor and cooling system consisting of a motor 10 having a water outlet 11 connected with the water jacket of the same and a radiator 12 and water tank 13 associated therewith which is formed with a water inlet 14 adapted to communicate with the water outlet 11 of the motor 10. A fan 15, which is attached to a fan pulley 16, is adapted to be driven by a fan belt 17 from the crank shaft of motor 10, which, being of ordinary construction, has not been shown in detail in this application.

My invention consists principally of a casting A having a pump chamber 47 to which is directly connected near the center of the same a water passageway 18. The passageway 18 is formed with a flange 19 by means of which the same may be directly bolted to the water outlet 11 of motor 10 so as to bring the interior of the water jacket of the said motor into communication with the interior of the pump casing 47. The one side of the pump chamber 47 is formed open and is adapted to be closed by means of a cover 20 which is rigidly bolted to the casing 47 by means of bolts 22, 23 and 24. From the upper portion of the pump casing 47 issues a neck 25 which communicates with the interior of the said pump casing and is connected with a casting 26 formed with a depending neck 27 by means of a hose connection 28. The casting 26 is formed with a flange by means of which said casting may be bolted with cap screws 30 to the underside of the water tank 13 of radiator 12 so as to bring the interior of the neck 27 of casting 26 is communication with the water inlet 14 of the said tank. In this manner, water may be drawn, as will be presently explained, from the water jacket of the motor 10 through the outlet 11, through the passageway 18, into pump casing 47 and from thereon discharged through the neck 25, the hose connection 28, into neck 27, into the water tank 13 of the cooling system of the motor.

To the center of the cover 20, I attach a boss 31 through which a shaft 32 passes. A stuffing box 33 is screwed upon the end of the boss 31 and serves to make a water tight connection between the said shaft and the pump casing. Shaft 32 terminates within the interior of the casing 47 and has secured to it by means of a pin 34 a propeller 35 which may be of any ordinary design, which is adapted to circulate the water from the engine and into the radiator of the motor as the said shaft 32 is rotated.

For supporting and journalling the shaft 32, I provide bearings separate from the boss 31 so that the thrust or pull of the belt does not cause wear within the said boss. This structure comprises primarily a tubular supporting member 36 cut away on one side and formed with a flange 37 on its other side extending outwardly toward the edge of the cover 20 of the pump, which tubular support is concentrically arranged relative to the shaft 32. On the extreme end of the shaft 32 is attached the pulley 16 previously referred to, which may be held in place by means of a taper pin 38 or any other suitable device. Within the pulley 16, the same is formed with an internal bore 39 into which the tubular support 36 extends. Support 36 is formed as a continuous ring at its extreme end, as indicated at 40, which is provided with a closure 41 fitting over the end of the shaft 32 adjacent the interior of the pulley 16. The interior of the portion 40 of support 36 is bored concentrically relative to the shaft 32 and has positioned within it two ball bearings 42 and 43 which snugly fit within the interior of the same. These ball bearings are held upon the shaft 32 upon enlarged portions 44 and 45 thereof and are secured thereto by means of a drive-fit. These bearings rest against an annular shoulder 46 formed on said shaft so that the said bearings are properly positioned. A cover plate 47 is secured to the support 36 to enclose the ball bearings 42 and 43 and to prevent the dirt and dust from entering the same. With this construction, it can readily be seen that the shaft 32 and propeller 35 mounted thereon are journalled on the ball bearings 42 and 43 which are supported on the tubular member 36. In this manner, all of the stress imparted to the pulley 16 is transmitted through these bearings and to the said support instead of through the boss 31 to which the stuffing box 33 is attached. A construction is thereby provided in which the life of the pump mechanism is greatly increased over and above the life of similar pumps where the bearings for the shafts thereof are directly formed on the pump casing. In addition, the tubular support 36 is constructed detachable so that the boss 31 may be readily threaded to receive the stuffing box 33 so that the said bearings 42 and 43 may be properly aligned, relative to the shaft 32.

For providing tension to the belt 17, I provide an idler pulley 48 which is rotatably mounted upon a bracket 49 pivoted on a stud shaft 50 which is secured to the pump casing 47 by means of a bolt 51. A coil spring 52 surrounding the shaft 50 operates to hold the pulley 48 in contact with the belt 17 to provide a uniform pressure against the same so that the proper belt tension is at all times attained.

My invention is exceedingly simple in construction and utilizes the existing portions of the motor for securing the drive therefor. The bearings used in journalling the pump shaft are entirely without the pump so that the same may be readily lubricated so that the lubricant used in connection with the same is not discharged into the pump chamber and circulated about in the cooling system of the motor. The bearings are so arranged that the same are in direct alignment with the drive belt thereby reducing the bending of the shaft and the binding in the stuffing box so that wear of the stuffing box and leakage of the pump is minimized.

In accordance with the patent statutes, I have described the principles of operation of my invention, together with the apparatus which I now consider to represent the best embodiment thereof, but I desire to have it understood that the construction shown is only illustrative and that the invention can be carried out by other means and applied to uses other than those above set forth within the scope of the following claims.

I claim:
1. In a water circulating pump adapted to be connected to the engine block of an automobile, a pump casing, inlet and outlet pump connections for said pump casing, a cover for said pump casing, a shaft extending through said cover and into said casing, a stuffing box mounted on an integral projection on said cover, a tubular supporting member removably secured to said cover and extending along and surrounding said shaft and having an opening allowing access to said stuffing box, a pulley secured to the extreme end of said shaft, said pulley having a portion projecting over said tubular supporting member, and bearings forming the sole support for said shaft positioned within said tubular supporting member whereby stress imparted to said pulley is transmitted through said bearings to said supporting member.

2. A water circulating pump including, a casing, a detachable cover for said pump, a shaft extending through said cover, a pump member secured to one end of said shaft, a pulley member secured to the other end of said shaft, a stuffing box mounted upon said cover, a bracket secured to said cover interposed between said pulley and said cover, and a long bearing supported solely by said bracket to support said shaft virtually entirely separate from said casing.

3. A water circulating pump including, a casing, a pump member within said casing, a shaft for operating said pump member, a detachable cover having a stuffing box formed therein for said shaft, a bracket supported by said casing, a long bearing supported solely by said bracket, a driving element secured to said shaft adjacent said bearing, said bearing providing a support for said shaft independent of said casing and stuffing box.

CHARLES H. SHIRK.